United States Patent [19]
Padgitt et al.

[11] 4,322,124
[45] Mar. 30, 1982

[54] LOW COST WIDE FIELD OF VIEW INFRARED SENSOR

[75] Inventors: Howard R. Padgitt, Park Ridge, Ill.; Frank J. Ferrin, Plymouth, Minn.

[73] Assignee: Honeywell Inc., Minneapolis, Minn.

[21] Appl. No.: 146,803

[22] Filed: May 5, 1980

[51] Int. Cl.$^3$ .............................................. G02B 13/06
[52] U.S. Cl. ................................... 350/1.4; 250/338; 350/441
[58] Field of Search ................. 350/1.1, 1.4, 1.6, 441; 250/347, 353, 343, 338

[56] References Cited

U.S. PATENT DOCUMENTS 3,002,092  9/1961  Cary .................... 250/353

OTHER PUBLICATIONS

Edmonds, et al., "Preparation and Properties of SiO Antireflection Coatings for GAs Injection Lasers With External Resonators", *Applied Optics,* vol. 10, No. 7, Jul. 1971, pp. 1591-1595.
Smith, W. J., *Modern Optical Engineering,* p. 157, McGraw-Hill, 1966.
*The Infrared Handbook,* Edited by Wolfe & Zissis, 1978 Edition, pp. 11-70, 11-71, and 10-4.

*Primary Examiner*—John K. Corbin
*Assistant Examiner*—Bruce M. Arnold
*Attorney, Agent, or Firm*—Albin Medved

[57] ABSTRACT

A wide field of view infrared sensor is disclosed. A field of view in excess of 180 degrees is achieved by the use of a single element, negative miniscus lens. There is provided a flat PbS detector element, and the lens has an anti-reflection coating of SiO.

8 Claims, 2 Drawing Figures

LOW COST WIDE FIELD OF VIEW INFRARED SENSOR

BACKGROUND OF THE INVENTION

Wide field of view infrared sensors have a number of useful applications. One such application is in an electro-optical helmet sight system, wherein an infrared sensor is mounted in a helmet for detecting infrared radiation impinging on the sensor. Although high image forming quality is generally not required, it is desirable that the sensor have a relatively uniform response over at least a hemisphere. The currently available sensors fall short of this requirement. Some prior art sensors provide a wide field of view in a first axis, but not in a second axis.

SUMMARY OF THE INVENTION

The present invention provides an improved infrared sensor with an increased and more symmetric field of view. It accomplishes this by use of a single element lens and thus also results in a lower cost. The sensor includes a detector element which in the preferred embodiment is a quartz substrate with PbS coating on one side and a long wavelength pass filter coating on the other side. A single element silicon negative meniscus lens, coated on both sides with SiO is mounted over the detector element such that infrared radiation impinging on the lens from any direction within a wide angle is appropriately bent by the lens and directed towards the detector. The lens is designed so as to take advantage of the optical principle known as "pupil distortion". The result is that the area of the detector as seen through the lens remains essentially constant over a very large angular field; thus the cosine losses normally experienced with planar detectors are effectively eliminated.

It is therefore an object of the present invention to provide an infrared sensor with a wide field of view. A further object of the present invention is to provide a wide field of view infrared sensor with axial symmetry and having a single lens element.

These and further objects will become apparent to those skilled in the art upon examination of the following specification, claims, and drawings, in which:

FIG. 1 shows a cross-section infrared sensor according to the present invention; and FIG. 2 is a representation of infrared radiation received by the sensor from different angles to the normal.

DESCRIPTION OF THE PREFERRED EMBODIMENT

Figure 1:
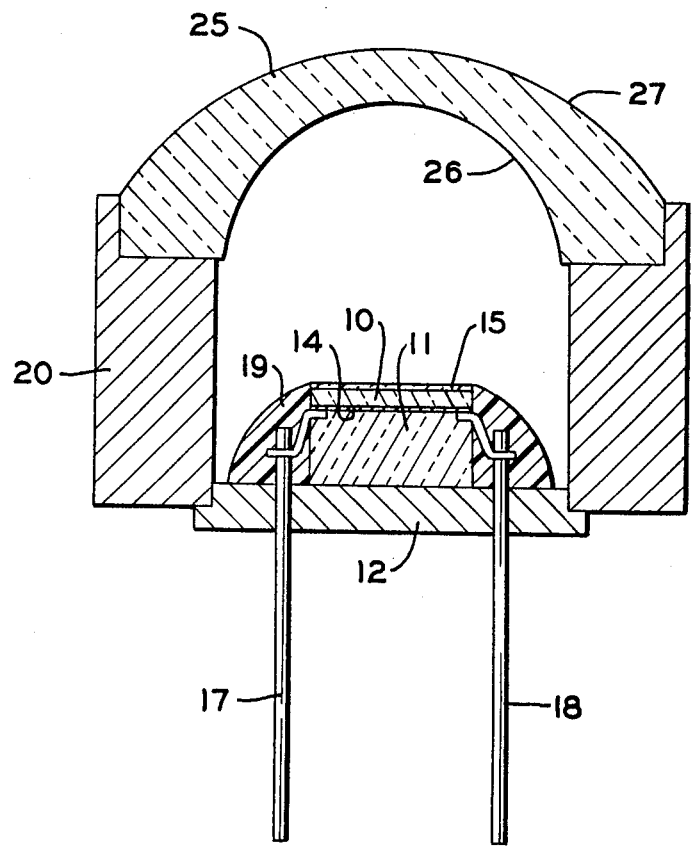

Referring to FIG. 1, a cross section of an infrared sensor according to the present invention is shown. Quartz substrate 10 is mounted by a sensor mount 11 on a header element 12. A lead sulfide coating constituting an infrared detector 14 is applied to the lower surface of quartz substrate 10, while a 2.4 to 3.0 micron optical filter 15 is positioned on the upper surface of quartz substrate 10. The lead sulfide coating is sensitive to infrared radiation and generates an electric signal in response thereto. Sensor leads 17 and 18 provide means for electric current conduction through header element 12 and are electrically connected to opposite ends of lower surface of quartz substrate 10 and in contact with detector 14. Sealant material 19 surrounds leads 17 and 18 on the detector side of header element 12 to provide a hermetic seal.

A negative meniscus lens 25 is held by a lens holder 20 in a fixed relationship to detector 14, such that detector 14 is positioned substantially normal to and centered on the lens axis. Header element 12, lens holder 20, and lens 25 comprise a hermetically sealed container enclosing the infrared detector/filter assembly.

The internal surface of lens 25 nearest the detector/filter assembly has a curvature of a relatively smaller radius as compared to the radius of curvature of the external surface of lens 25. The center of curvature of both lens surfaces lie on the side of the lens nearest detector 14 along the axis intersecting lens 25 and detector 14. The ratio of the two radii is approximately two to one.

In the preferred embodiment, the radius of curvature of the internal surface of lens 25 is 4.04 millimeters, while the radius of curvature of the external surface is 7.50 millimeters. Lens 25 is constructed of silicon (index of refraction 3.439 at 2.55 microns) and coated on both the internal and external surfaces with an anti-reflection coating of silicon monoxide (index of refraction 1.78 at 2.55 microns).

Figure 2:
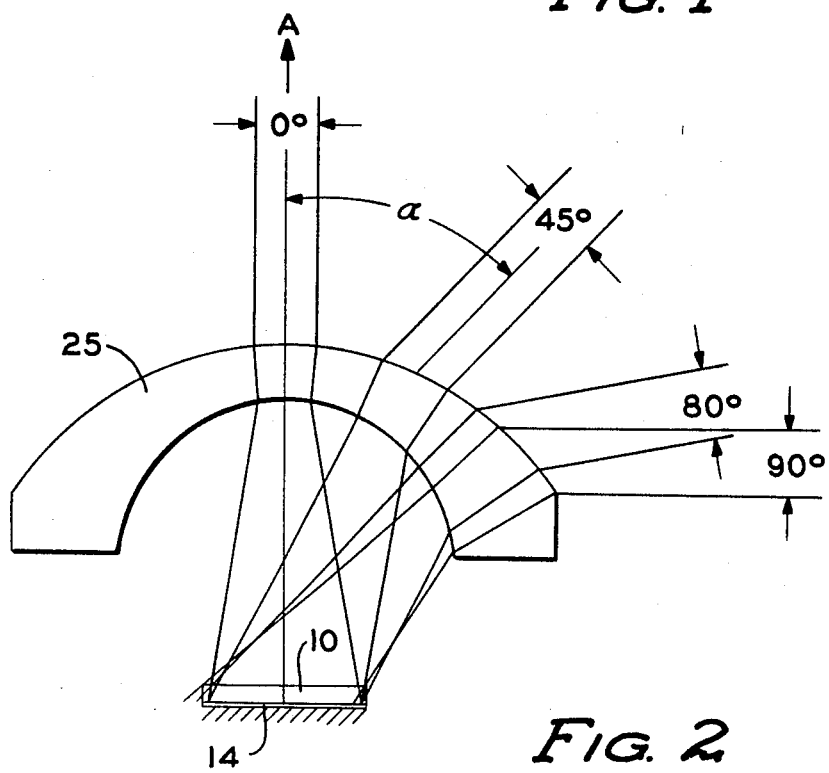

FIG. 2 illustrates how the light rays impinging on lens 25 from various angles with respect to the lens axis are bent by lens 25 and directed onto detector 14. The apparatus shown in the preferred embodiment of FIG. 1 yielded experimental results shown in Table 1 below.

TABLE 1

| α, Deg | Volts | α, Deg | Volts |
|---|---|---|---|
| 0 | 1.00 | 0 | 1.00 |
| 20 | 1.08 | −20 | 1.10 |
| 40 | 1.20 | −40 | 1.15 |
| 60 | 1.50 | −60 | 1.25 |
| 80 | 1.90 | −80 | 1.45 |
| 90 | 1.30 | −90 | 1.40 |
| 100 | 0.80 | −100 | 0.90 |

Table 1 represents the voltage amplitude of the signal appearing between leads 17 and 18 in response to a constant intensity infrared light source positioned at various angles with respect to the axis of lens 25. It can be seen that the sensor produced a wide field of view response, in accordance with the desired objective of the present invention.

A unique and improved wide field of view infrared sensor has been shown and described in the foregoing specification. Various modifications of the inventive concepts will be obvious to those skilled in the art, without departing from the spirit of the invention. It is intended that the scope of the invention be limited only by the following claims.

What is claimed is:

1. A wide field of view infrared sensor comprising:
   an infrared detector mounted on a support member;
   a single element infrared transmitting negative meniscus lens mounted relative to said infrared detector, such that radiation impinging on said lens from a wide angle of sources is directed to said infrared detector, the surface of said lens nearest said infrared detector having a radius of curvature which is shorter than the radius of curvature of the lens surface furthest away from said infrared detector; and
   an antireflective coating applied to each of the two lens surfaces.

2. Apparatus according to claim 1, wherein said antireflective coating is of silicon monoxide.

3. Apparatus according to claim 2 wherein said lens is constructed of silicon having an index of refraction of 3.439 at 2.55 microns and wherein said antireflective coating on said lens is of silicon monoxide having an index of refraction of 1.78 at 2.55 microns.

4. Apparatus according to claim 3, wherein the radius of curvature of the surface of said lens nearest said infrared detector is approximately 4 millimeters and the radius of curvature of the surface of said lens furthest away from said infrared detector is approximately 7.5 millimeters.

5. Apparatus according to claims 1, 2, or 3 wherein said infrared detector comprises a film of lead sulfide applied to a quartz substrate.

6. Apparatus according to claim 5 wherein an optical interference filter with a transmission band between 2.4 to 3.0 microns is positioned between said detector and said lens.

7. Apparatus according to claim 6 wherein said detector is mounted on a support member and lens holding means are provided for maintaining said lens in a stable relative position to said detector, said lens, lens holding means, and support means in combination forming a hermetically sealed housing surrounding said detector; and electrically conductive leads are provided through said support means, said electrically conductive leads being connected respectively to said detector at spaced apart locations to provide a means for detecting electrical signals generated by said detector in response to infrared radiation received through said lens.

8. Apparatus according to claim 7, wherein the radius of curvature of the surface of said lens nearest said infrared detector is approximately 4 millimeters and the radius of curvature of the surface of said lens furthest away from said infrared detector is approximately 7.5 millimeters.

* * * * *